United States Patent
Poorebrahim Gilkalaye et al.

(10) Patent No.: US 11,625,377 B1
(45) Date of Patent: Apr. 11, 2023

(54) SYSTEMS AND METHODS FOR ENABLING TWO PARTIES TO FIND AN INTERSECTION BETWEEN PRIVATE DATA SETS WITHOUT LEARNING ANYTHING OTHER THAN THE INTERSECTION OF THE DATASETS

(71) Applicant: TripleBlind, Inc., Kansas City, MO (US)

(72) Inventors: Babak Poorebrahim Gilkalaye, Kansas City, MO (US); Riddhiman Das, Parkville, MO (US); Greg Storm, Parkville, MO (US)

(73) Assignee: TRIPLEBLIND, INC., Kansas City, MO (US)

( * ) Notice: Subject to any disclaimer, the term of this patent is extended or adjusted under 35 U.S.C. 154(b) by 0 days.

(21) Appl. No.: 17/591,779

(22) Filed: Feb. 3, 2022

(51) Int. Cl.
*G06F 7/00* (2006.01)
*G06F 16/22* (2019.01)
*G06F 16/2453* (2019.01)
*H04L 9/32* (2006.01)

(52) U.S. Cl.
CPC .... *G06F 16/2255* (2019.01); *G06F 16/24544* (2019.01); *G06F 16/24545* (2019.01); *H04L 9/3236* (2013.01); *H04L 2209/46* (2013.01)

(58) Field of Classification Search
CPC .......... G06F 16/2255; G06F 16/24545; G06F 16/24544; H04L 2209/46; H04L 9/3236
See application file for complete search history.

(56) References Cited

U.S. PATENT DOCUMENTS

| | | | |
|---|---|---|---|
| 1,045,208 | A | 11/1912 | Spencer |
| 10,362,001 | B2 | 7/2019 | Yan |
| 10,419,360 | B2 | 9/2019 | Dawson |
| 10,592,012 | B2 | 1/2020 | Dawson |
| 10,560,872 | B2 | 2/2020 | Dawson |
| 10,594,623 | B2 | 3/2020 | Dawson |
| 10,623,998 | B2 | 4/2020 | Dawson |
| 10,833,871 | B2 * | 11/2020 | Ranellucci ............ H04L 9/3255 |
| 10,924,460 | B2 * | 2/2021 | Storm .................. G06V 10/454 |
| 11,316,676 | B2 | 4/2022 | Kinjo |

(Continued)

FOREIGN PATENT DOCUMENTS

| | | |
|---|---|---|
| WO | WO 2021/119365 | 6/2021 |
| WO | WO2021/119365 A1 * | 6/2021 |
| WO | WO2021119367 * | 6/2021 |

OTHER PUBLICATIONS

Adedi et al., FedSL: Federated Split Learning on Distributed Sequential Data in Recurrent Neural Networks; Published arXib, 2011.*

(Continued)

*Primary Examiner* — Daniel A Kuddus

(57) ABSTRACT

A system and method are disclosed for comparing private sets of data. The method includes encoding first elements of a first data set such that each element of the first data set is assigned a respective number in a first table, encoding second elements of a second data set such that each element of the second data set is assigned a respective number in a second table, applying a private compare function to compute an equality of each row of the first table and the second table to yield an analysis and, based on the analysis, generating a unique index of similar elements between the first data set and the second data set.

17 Claims, 4 Drawing Sheets

(56) References Cited

U.S. PATENT DOCUMENTS

| | | | |
|---|---|---|---|
| 2006/0233377 | A1 | 10/2006 | Chang |
| 2014/0108813 | A1 | 4/2014 | Pauker |
| 2016/0103901 | A1 | 4/2016 | Kadav |
| 2016/0294550 | A1* | 10/2016 | French ............... G06Q 20/4012 |
| 2016/0335440 | A1* | 11/2016 | Clark ..................... H04L 9/085 |
| 2016/0342608 | A1 | 11/2016 | Burshteyn |
| 2017/0359321 | A1* | 12/2017 | Rindal .................. G06F 21/602 |
| 2017/0372201 | A1 | 12/2017 | Gupta |
| 2018/0039884 | A1 | 2/2018 | Dalton |
| 2018/0227296 | A1 | 8/2018 | Joshi |
| 2018/0367509 | A1 | 12/2018 | O'Hare |
| 2019/0005399 | A1 | 1/2019 | Noguchi |
| 2019/0116080 | A1* | 4/2019 | Oshima ............... H04L 12/4625 |
| 2019/0116180 | A1* | 4/2019 | Teranishi .............. H04L 9/3234 |
| 2019/0228299 | A1 | 7/2019 | Chandran |
| 2019/0294805 | A1 | 9/2019 | Taylor |
| 2019/0312772 | A1 | 10/2019 | Zhao |
| 2019/0332944 | A1 | 10/2019 | Bai |
| 2020/0044862 | A1* | 2/2020 | Yadlin ....................... G06F 9/54 |
| 2020/0158745 | A1 | 5/2020 | Tian |
| 2020/0186528 | A1* | 6/2020 | Fan ......................... G06F 17/16 |
| 2020/0193279 | A1 | 6/2020 | Hostetler |
| 2020/0202184 | A1 | 6/2020 | Shrestha |
| 2020/0228313 | A1 | 7/2020 | Storm |
| 2020/0286145 | A1* | 9/2020 | Storm ................. G06Q 20/1235 |
| 2020/0296128 | A1* | 9/2020 | Wentz ................. H04L 63/1433 |
| 2020/0322141 | A1 | 10/2020 | Kinjo |
| 2020/0342288 | A1 | 10/2020 | Xi |
| 2020/0372360 | A1 | 11/2020 | Vu |
| 2021/0019605 | A1 | 1/2021 | Rouhani |
| 2021/0026860 | A1 | 1/2021 | Wang |
| 2021/0035330 | A1 | 2/2021 | Xie |
| 2021/0064760 | A1 | 3/2021 | Sharma |
| 2021/0142177 | A1 | 5/2021 | Mallya |
| 2021/0150024 | A1 | 5/2021 | Zhang |
| 2021/0157912 | A1 | 5/2021 | Kruthiveti Subrahmanyeswara Sai |
| 2021/0194668 | A1* | 6/2021 | Masters ................. G06F 21/602 |
| 2021/0248268 | A1 | 8/2021 | Ardhanari |
| 2021/0266170 | A1 | 8/2021 | Rossi |
| 2021/0314140 | A1 | 10/2021 | Stephenson |
| 2021/0334621 | A1 | 10/2021 | Shimizu |
| 2021/0350357 | A1 | 11/2021 | Lafontaine |
| 2021/0357859 | A1 | 11/2021 | Malvankar |
| 2021/0374502 | A1 | 12/2021 | Roth |
| 2021/0385069 | A1 | 12/2021 | Reid |
| 2021/0406386 | A1 | 12/2021 | Ortiz |
| 2022/0004654 | A1* | 1/2022 | Patel ..................... G06F 21/602 |
| 2022/0005654 | A1* | 1/2022 | Schuler ................ H01H 13/704 |
| 2022/0012672 | A1 | 1/2022 | Inman |
| 2022/0038271 | A1* | 2/2022 | Ranellucci ............ H04L 9/0819 |
| 2022/0050921 | A1 | 2/2022 | LaFever |
| 2022/0051276 | A1 | 2/2022 | Zelocchi |
| 2022/0108026 | A1 | 4/2022 | Ortiz |
| 2022/0121731 | A1 | 4/2022 | Growth |

OTHER PUBLICATIONS

Abedi, Ali, and Shehroz S. Khan. "FedSL: Federated Split Learning on Distributed Sequential Data in Recurrent Neural Networks", arXiv preprint arXiv:2011.03180 (Year 2021).

Nir Bitansky et al., "Post-quantum Zero Knowledge in Constant Rounds"; Jun. 2020; 48 pages (Year 2020).

Thapa et al., "SplitFed: When Federated Learning Meets Split Learning", Cornell University Library/Computer Science/Machine Learning, Apr. 25, 2020, [online] [retrieved on Dec. 15, 2021] Retrieved from the Internet URL:arXiv:2004.12088v, entire document.

Ads et al., "Multi-limb Split Learning for Tumor Classification on Vertically Distributed Data", Date of Conference: Dec. 5-7, 2021, IEEE (Year: 2021).

* cited by examiner

SYSTEMS AND METHODS FOR ENABLING TWO PARTIES TO FIND AN INTERSECTION BETWEEN PRIVATE DATA SETS WITHOUT LEARNING ANYTHING OTHER THAN THE INTERSECTION OF THE DATASETS

TECHNICAL FIELD

The present disclosure generally relates to private data sets and enabling two parties to find an intersection between two data sets without learning anything about the other party's data set other than the intersection.

BACKGROUND

The existing solutions for performing private set interactions is to require a comparison of each data point in a first set with each data point in a second data set to see where they match. Thus, if there are two dataset of size m and n, the system will need to perform (m×n) comparisons which can be infeasible if tm and n are big numbers.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

INTRODUCTION

Figure 1A:
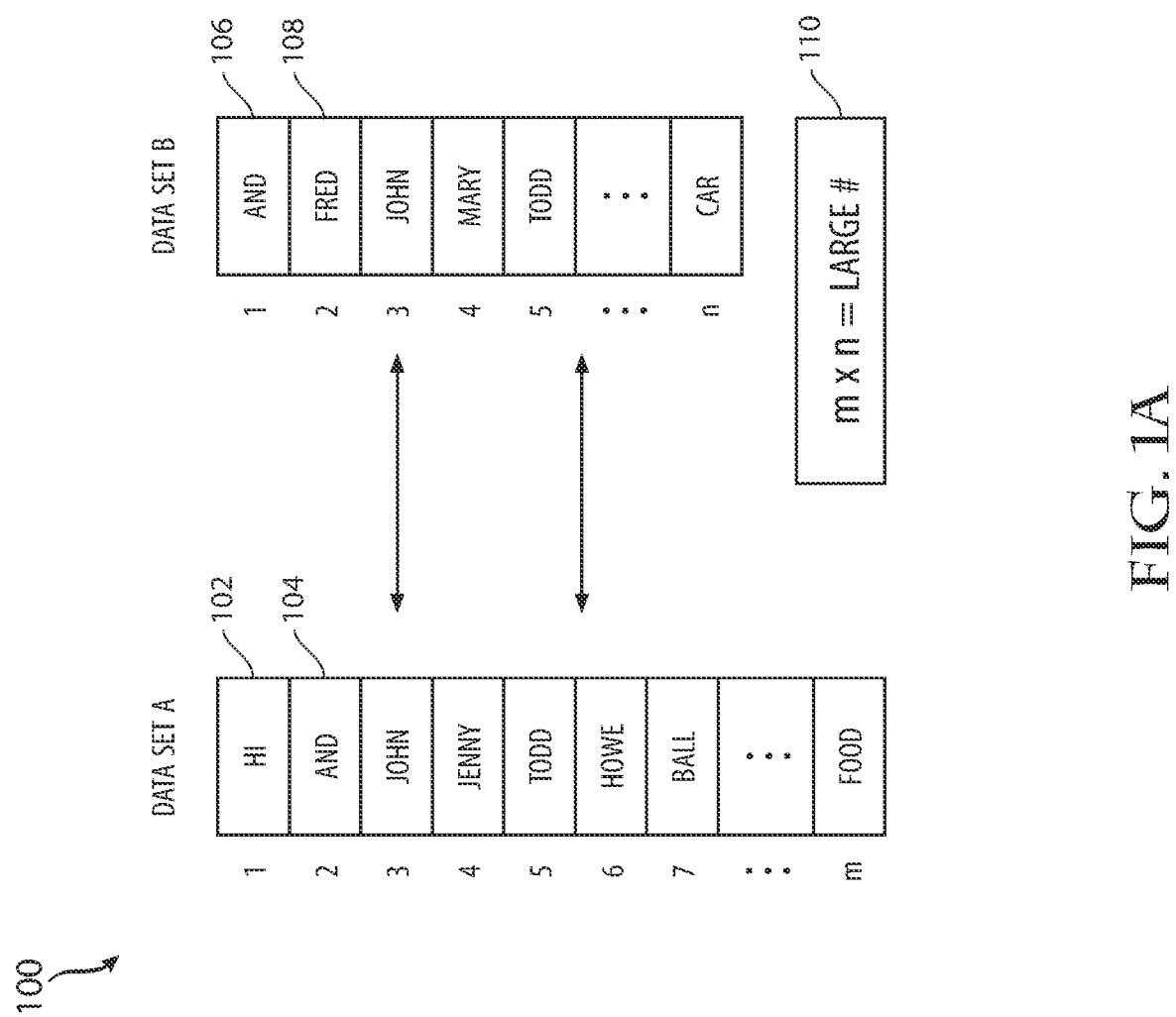
FIG. 1A illustrates the issue with different private data sets and how a comparison can be done but where there is a need to maintain privacy.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the following description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

BRIEF DESCRIPTION

Propose herein is a novel approach using a multi-party computation function, such as the "privatecompare" function, to determine an intersection of private sets of data. A system and method are disclosed to accomplish this task. The method includes encoding first elements of a first data set such that each element of the first data set is assigned a respective number in a first table, encoding second elements of a second data set such that each element of the second data set is assigned a respective number in a second table, applying a private compare function to compute an equality of each row of the first table and the second table to yield an analysis and, based on the analysis, generating a unique index of similar elements between the first data set and the second data set.

An example system includes a processor and a computer-readable storage device storing instructions which, when executed by the processor, cause the processor to perform operations including encoding first elements of a first data set such that each element of the first data set is assigned a respective number in a first table, encoding second elements of a second data set such that each element of the second data set is assigned a respective number in a second table, applying a private compare function to compute an equality of each row of the first table and the second table to yield an analysis and, based on the analysis, generating a unique index of similar elements between the first data set and the second data set.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

DETAILED DESCRIPTION

Disclosed herein is a new system for using a multi-party computation function, such as the "privatecompare" function, to determine an intersection of private sets of data. Various embodiments are disclosed to accomplish this task.

FIG. 1A illustrates an issue with respect to comparing private data sets. The private data sets 100 shown include a data set A with a first entry of the word "Hi" 102 and a second entry of the word "And" 104. Other data is shown down to the $m^{th}$ value. Data set B includes a first value of "And" 106 and a second value of "Fred" 108 with additional data down to the $n^{th}$ value of "Car". If one were to determine a intersection of these two data sets, the typical approach would be to compare data set A's first value "Hi" 102 to every other data set value in data set B up to the $n^{th}$ value of "Car". And then do the same for each of the 2–m values of data set A. This would result in m×n calculations or comparisons 110 which could be a very large number of m and n are large numbers.

Figure 1B:
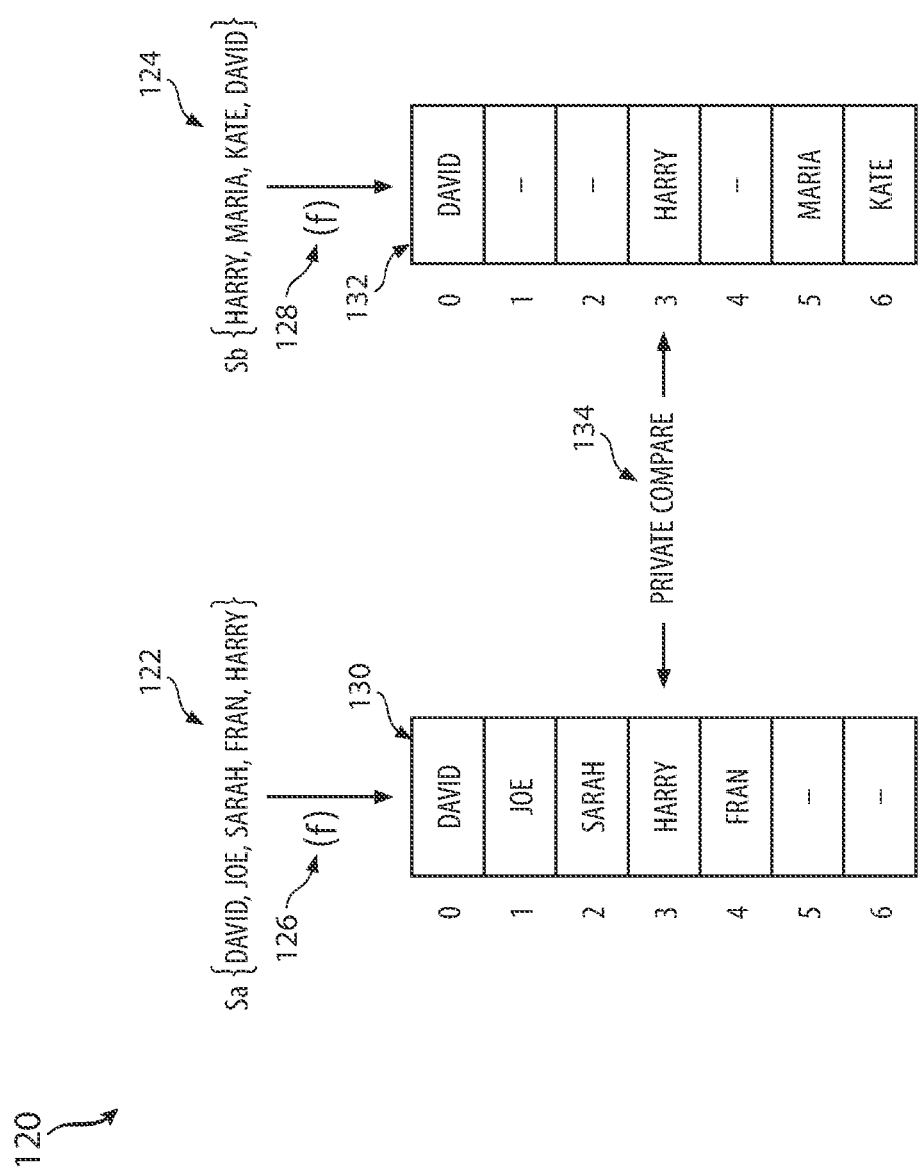
FIG. 1B illustrates the approach of using multi-party computation to compute private set intersections.

FIG. 1B illustrates different tables or datasets 120 and how they can be compared using the principles disclosed herein. A first data set $S_a$ 122 includes the five names of David, Joe, Sarah, Fran, and Harry. A second data set $S_b$ 124 includes four names Harry, Maria, Kate and David. The process here is to use multi-party computation to compute a private set intersection. Multi-party computation (MPC) is a cryptographic tool that allows multiple parties to make calculations using their comb ed data, without revealing their individual input. MPC works by using complex encryption to distribute computation between multiple parties. This disclosure uses in one aspect MPC and in other aspects the comparison can be done using other tools. The way it can work is as follows.

The first data set $S_a$ 122 for a first party can have a size of m. The second data set $S_b$ for a second party can have a data set size of n. The first step is to encode the element to an integer. The encoding can use any algorithm 126, 128 to do the encoding. The approach can use a public table hash function to generate a unique index for the similar elements and reduce the number of comparisons. A public function (f) can operate such that: f(David)=0, f(Joe) =1, f(Sarah)=2, f(Harry)=–3, f(Fran)=4, f(Maria)=5, f(Kate)=6. The function can be run on all of the data in both data sets with the results shown in table 130 and 132. Note that the parties know the public function but they do not know the other parties' data other than the overlapping intersection data. The approach enables them to know what data they share but nothing else. The private compare or similar algorithm 134 can be used to compute the equality of each row of the two table and thus reduce the number of comparisons from 20 pairwise comparisons (4×5) to 7. In this case, the parties can identify quickly that they share the values of "David" and "Harry". That is all they will find out about the other private set of data.

It is possible to get better performance if the system allows collisions to happen in the table hash function. A collision occurs when more than one value to be hashed by a particular hash function has to the same slot in the table or data structure (hash table) being generated by the hash function. For two lists each of size 100,000, there can be two options. First, collisions are not allowed. In this case, the system needs to choose a big hash table like a 20 million-row table (to avoid collisions) and the process will end up with 20 million comparisons. In a second option, collisions are allowed. In this case, the system can choose the hash table with 25,000 rows and might have at maximum almost 12 collisions per row. The system will need to do 144*25000 comparisons or approximately 4 million comparisons. The approach of allowing collisions can thus improve the performance as many less comparisons are needed.

Figure 2:
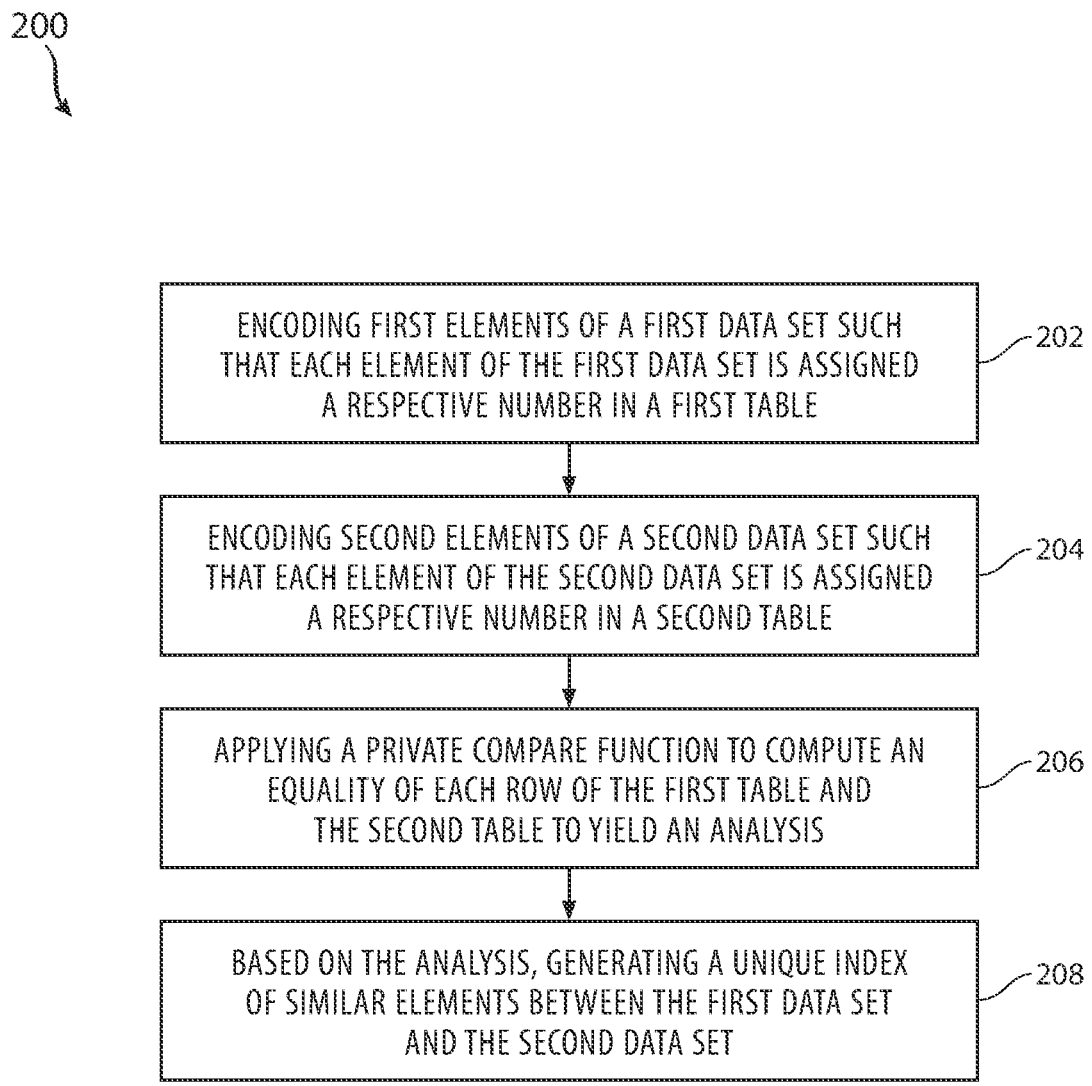
FIG. 2 illustrates a method embodiment related to computing private set intersections.

FIG. 2 illustrates a method embodiment. The method 200 includes one or more steps of encoding first elements of a first data set such that each element of the first data set is assigned a respective number in a first table (202), encoding second elements of a second data set such that each element of the second data set is assigned a respective number in a second table (204), applying a private compare function to compute an equality of each row of the first table and the second table to yield an analysis (206) and, based on the analysis, generating a unique index of similar elements between the first data set and the second data set (208).

The respective number can be an integer or a non-integer value. In one aspect, the private compare function is applied using multi-party computation.

The step of encoding the first elements and encoding the second elements can be performed using a table hash function. The table hash function can be known by a first party associated with the first data set and a second party associated with the second data set.

The respective number in the first table and the respective number in the second table can be a result of applying a public hash function to each element in the first data set and the second data set.

In one aspect, the unique index of similar elements between the first table and the second table can include an intersection of the first data set and the second data set in a manner that neither a first party associated with the first data set nor a second party associated with the second data set can learn anything other than about the intersection of the first data set and the second data set. The step of encoding the first elements further can include applying a public function to generate first indices for the first data set and encoding the second elements further comprises applying the public function to generate second indices for the second data set.

The private compare function can include a table hash function.

Furthermore, the encoding of the first elements and the encoding of the second elements can be performed using a public function and wherein the private compare function includes a public table hash function.

An example system can be shown in FIG. 3 below and can include a processor and a computer-readable storage device storing instructions which, when executed by the processor, cause the processor to perform operations including encoding first elements of a first data set such that each element of the first data set is assigned a respective number in a first table, encoding second elements of a second data set such that each element of the second data set is assigned a respective number in a second table, applying a private compare function to compute an equality of each row of the first table and the second table to yield an analysis and, based on the analysis, generating a unique index of similar elements between the first data set and the second data set.

Figure 3:
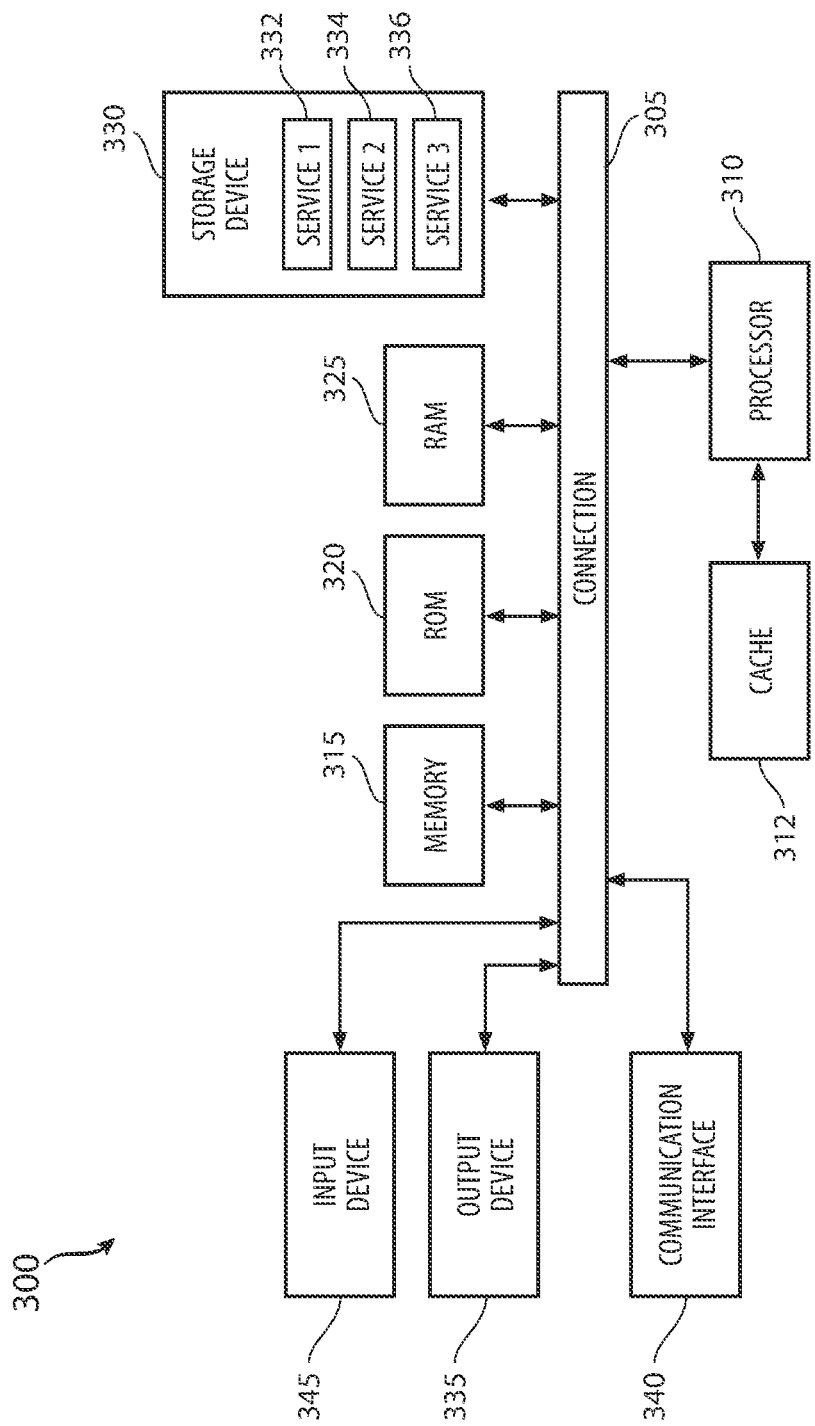
FIG. 3 illustrates a system embodiment.

FIG. 3 illustrates example computer device that can be used in connection with any of the systems disclosed herein. In this example, FIG. 3 illustrates a computing system 300 including components in electrical communication with each other using a connection 305, such as a bus. System 300 includes a processing unit (CPU or processor) 310 and a system connection 305 that couples various system components including the system memory 315, such as read only memory (ROM) 320 and random access memory (RAM) 325, to the processor 310. The system 300 can include a cache of high-speed memory connected directly with, in close proximity to, or integrated as part of the processor 310. The system 300 can copy data from the memory 315 and/or the storage device 330 to the cache 312 for quick access by the processor 310. In this way, the cache can provide a performance boost that avoids processor 310 delays while waiting for data. These and other modules can control or be configured to control the processor 310 to perform various actions. Other system memory 315 may be available for use as well. The memory 315 can include multiple different types of memory with different performance characteristics. The processor 310 can include any general purpose processor and a hardware or software service or module, such as service (module) 1 332, service (module) 2 334, and service (module) 3 336 stored in storage device 330, configured to control the processor 310 as well as a special-purpose processor where software instructions are incorporated into the actual processor design. The processor 310 may be a completely self-contained computing system, containing multiple cores or processors, a bus, memory controller, cache, etc. A multi-core processor may be symmetric or asymmetric.

To enable user interaction with the device 300, an input device 345 can represent any number of input mechanisms, such as a microphone for speech, a touch-sensitive screen for gesture or graphical input, keyboard, mouse, motion input, speech and so forth. An output device 335 can also be one or more of a number of output mechanisms known to those of skill in the art. In some instances, multimodal systems can enable a user to provide multiple types of input to communicate with the device 300. The communications interface 340 can generally govern and manage the user input and system output. There is no restriction on operating on any particular hardware arrangement and therefore the basic features here may easily be substituted for improved hardware or firmware arrangements as they are developed.

Storage device 330 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 325, read only memory (ROM) 320, and hybrids thereof The storage device 330 can include services or modules 332, 334, 336 for controlling the processor 310. Other hardware or software modules are contemplated. The storage device 330 can be connected to the system connection 305. In one aspect, a hardware module that performs a particular function can include the software component stored in a computer-readable medium in connection with the necessary hardware components, such as the processor 310, connection 305, output device 335, and so forth, to carry out the function.

In some cases, such a computing device or apparatus may include a processor, microprocessor, microcomputer, or other component of a device that is configured to carry out the steps of the methods disclosed above. In some examples, such computing device or apparatus may include one or more antennas for sending and receiving RF signals. In some examples, such computing device or apparatus may include an antenna and a modem for sending, receiving, modulating, and demodulating RF signals, as previously described.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The methods discussed above are illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the methods disclosed herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but can have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

We claim:

1. A method comprising:
   encoding, via a first processor associated with a first computing device, first elements of a first data set such that each element of the first data set is assigned a respective number in a first table;
   encoding, via a second processor associated with a second computing device independent of the first computing device, second elements of a second data set such that each element of the second data set is assigned a respective number in a second table;
   applying a private compare function to compute an equality of each row of the first table and the second table to yield an analysis, wherein the private compare function comprises a multi-party computation function that causes the first computing device and the second computing device to learn only one or more shared value between the first table and the second table and wherein the private compare function comprises a table hash function that allows collisions in which more than one value in the first data set hashes to a same slot in the first table or that more than one value in the second data set hashes to a same slot in the second table; and based on the analysis, generating a unique index of similar elements between the first data set and the second data set.

2. The method of claim 1, wherein the respective number is an integer.

3. The method of claim 1, wherein encoding the first elements and encoding the second elements is performed using the table hash function.

4. The method of claim 3, wherein the table hash function is known by a first party associated with the first data set and a second party associated with the second data set.

5. The method of claim 1, wherein the respective number in the first table and the respective number in the second table are a result of applying a public hash function to each element in the first data set and the second data set, wherein the public hash function is publicly known and used by both the first computing device and the second computing device to generate the unique index of similar elements between the first data set and the second data set.

6. The method of claim 1, wherein the unique index of similar elements between the first table and the second table comprises an intersection of the first data set and the second data set in a manner that neither the first computing device associated with the first data set nor the second computing device associated with the second data set learns anything other than about the intersection of the first data set and the second data set.

7. The method of claim 1, wherein encoding the first elements further comprises applying a public function to generate first indices for the first data set and encoding the second elements further comprises applying the public function to generate second indices for the second data set, wherein the public hash function is publicly known and used by both the first computing device and the second computing device to generate the unique index of similar elements between the first data set and the second data set.

8. The method of claim 1, wherein the private compare function comprises a table hash function.

9. The method of claim 1, wherein the encoding of the first elements and the encoding of the second elements is performed using a public hash function, wherein the public hash function is publicly known and used by both the first computing device and the second computing device to generate the unique index of similar elements between the first data set and the second data set.

10. A system comprising:
a first processor;
a first computer-readable storage device storing instructions which, when executed by the first processor, cause the first processor to perform operations comprising:
encoding first elements of a first data set such that each element of the first data set is assigned a respective number in a first table;
a second processor independent of the first processor; and
a second computer-readable storage device storing instructions which, when executed by the second processor, cause the second processor to perform operations comprising:
encoding second elements of a second data set such that each element of the second data set is assigned a respective number in a second table;

applying a private compare function to compute an equality of each row of the first table and the second table to yield an analysis, wherein the private compare function comprises a multi-party computation function that causes the first processor and the second processor to learn only one or more shared value between the first table and the second table and wherein the private compare function comprises a table hash function that allows collisions in which more than one value in the first data set hashes to a same slot in the first table or that more than one value in the second data set hashes to a same slot in the second table; and based on the analysis, generating a unique index of similar elements between the first data set and the second data set.

11. The system of claim 10, wherein the respective number is an integer.

12. The system of claim 10, wherein encoding the first elements and encoding the second elements is performed using the table hash function.

13. The system of claim 12, wherein the table hash function is known by a first party associated with the first data set and a second party associated with the second data set.

14. The system of claim 10, wherein the respective number in the first table and the respective number in the second table are a result of applying a public hash function to each element in the first data set and the second data set, wherein the public hash function is publicly known and used by both the first computing device and the second computing device to generate the unique index of similar elements between the first data set and the second data set.

15. The system of claim 10, wherein the unique index of similar elements between the first table and the second table comprises an intersection of the first data set and the second data set in a manner that neither the first computing device associated with the first data set nor the second computing device associated with the second data set learns anything other than about the intersection of the first data set and the second data set.

16. The system of claim 10, wherein encoding the first elements further comprises applying a public hash function to generate first indices for the first data set and encoding the second elements further comprises applying the public hash function to generate second indices for the second data set, wherein the public hash function is publicly known and used by both the first computing device and the second computing device to generate the unique index of similar elements between the first data set and the second data set.

17. The system of claim 10, wherein the encoding of the first elements and the encoding of the second elements is performed using a public hash function, wherein the public hash function is publicly known and used by both the first computing device and the second computing device to generate the unique index of similar elements between the first data set and the second data set.

* * * * *